US007284255B1

(12) United States Patent
Apel et al.

(10) Patent No.: US 7,284,255 B1
(45) Date of Patent: Oct. 16, 2007

(54) AUDIENCE SURVEY SYSTEM, AND SYSTEM AND METHODS FOR COMPRESSING AND CORRELATING AUDIO SIGNALS

(75) Inventors: Steven G. Apel, 127 Greensward La., Cherry Hill, NJ (US) 08002; Stephen C. Kenyon, Fairfax, VA (US)

(73) Assignee: Steven G. Apel, Cherry Hill, NJ (US)

( * ) Notice: Subject to any disclaimer, the term of this patent is extended or adjusted under 35 U.S.C. 154(b) by 0 days.

(21) Appl. No.: 09/441,539

(22) Filed: Nov. 16, 1999

Related U.S. Application Data

(60) Provisional application No. 60/140,190, filed on Jun. 18, 1999.

(51) Int. Cl.
*H04N 7/00* (2006.01)
*H04N 17/00* (2006.01)
*H04H 7/04* (2006.01)
*G10L 15/00* (2006.01)

(52) U.S. Cl. .......................... 725/18; 725/19; 704/201; 704/216; 704/237

(58) Field of Classification Search .................. 725/18, 725/19; 382/168–230
See application file for complete search history.

(56) References Cited

U.S. PATENT DOCUMENTS 3,919,479 A * 11/1975 Moon et al. ................ 704/237
4,547,804 A 10/1985 Greenberg
4,677,466 A 6/1987 Lert, Jr. et al.
4,697,209 A 9/1987 Kiewit et al.
5,373,567 A * 12/1994 Takahashi et al. .......... 382/216
5,574,962 A * 11/1996 Fardeau et al. ............ 455/2.01
5,826,165 A 10/1998 Escheita et al.
5,835,634 A * 11/1998 Abrams ...................... 382/222

OTHER PUBLICATIONS (Microsoft Computer Dictionary; Microsoft Press; 1999; p. 421).*
(Merriam Webster's Collegiate Dictionary; Merriam Webster Incorporated; 1997; Tenth Edition; p. 1146).*

* cited by examiner

*Primary Examiner*—Reuben M. Brown
(74) *Attorney, Agent, or Firm*—Morgan, Lewis & Bockius LLP

(57) ABSTRACT

A system and method are disclosed for performing audience surveys of broadcast audio from radio and television. A small body-worn portable collection unit samples the audio environment of the survey member and stores highly compressed features of the audio programming. A central computer simultaneously collects the audio outputs from a number of radio and television receivers representing the possible selections that a survey member may choose. On a regular schedule the central computer interrogates the portable units used in the survey and transfers the captured audio feature samples. The central computer then applies a feature pattern recognition technique to identify which radio or television station the survey member was listening to at various times of day. This information is then used to estimate the popularity of the various broadcast stations.

7 Claims, 11 Drawing Sheets

AUDIENCE SURVEY SYSTEM, AND SYSTEM AND METHODS FOR COMPRESSING AND CORRELATING AUDIO SIGNALS

This application claims the benefit of U.S. Provisional Application(s) No(s): 60/140,190 filing data Jun. 18, 1999

FIELD OF THE INVENTION

The invention relates to a method and system for automatically identifying which of a number of possible audio sources is present in the vicinity of an audience member. This is accomplished through the use of audio pattern recognition techniques. A system and method is disclosed that employs small portable monitoring units worn or carried by people selected to form a panel that is representative of a given population. Audio samples taken at regular intervals are compressed and stored for later comparison with reference signals collected at a central site. This allows a determination to be made regarding which broadcast audio signals each survey member is listening to at different times of day. An automatic survey of listening preferences can then be conducted.

DISCUSSION OF THE PRIOR ART

Radio and television surveys have been conducted for many years to determine the relative popularity of programs and broadcast stations. This information is necessary for a number of reasons including the determination of advertising price structure and deciding if certain programs should be continued or canceled. One of the most common methods for performing these surveys is for survey members to manually record the radio and television stations that they listen to and watch at various times of day. The maintaining of these manual logs is cumbersome and inaccurate. Additionally, transferring the information in the logs to an automated system represents an additional time consuming process.

Various systems have been developed that provide a degree of automation to conducting these surveys. In a typical semiautomatic survey system an electronic device records which television station is being viewed in a survey member's home. The survey member may optionally enter the number of people who are viewing the program. These data are electronically transferred to a central location where survey statistics are compiled.

Automatic survey systems have been devised that substantially improve efficiency. Many of the methods used involve the injection of a coded identification signal within the audio or video. There are several problems with these so-called active identification systems. First, each broadcaster must cooperate with the survey organization by installing the coding equipment in its broadcast facility. This represents an additional expense and complication to the broadcaster that may not be acceptable. The use of identification codes can also result in audio or video artifacts that are objectionable to the audience. An active encoding system is described by Best et al. in U.S. Pat. No. 4,876,617. Best employs two notch filters to remove narrow frequency bands from the audio signal. A frequency shift keyed signal is then injected into these notches to carry the identification code. Codes are repeatedly inserted into the audio when there is sufficient signal energy to mask the codes. However, when the injection level of the code is sufficient to assure reliable decoding it is perceptible to listeners. Conversely, when the code injection level is reduced to become imperceptible decoding reliability suffers. Best has improved on this invention as taught in U.S. Pat. No. 5,113,437. This system uses several sets of code frequencies and switches among them in a pseudo-random manner. This reduces the audibility of the codes.

Fardeau et al. describe a different type of system in U.S. Pat. No. 5,574,962 and U.S. Pat. No. 5,581,800 where the energy in one or more frequency bands is modulated in a predetermined manner to create a coded message. A small body-worn (or carried) device receives the encoded audio from a microphone and recovers the embedded code. After decoding, the identification code is stored for later transfer to a central computer. The problem remains that all broadcast stations to be detected by the system must be persuaded to install code generation and insertion equipment in their audio feeds.

Broughton et al. describe a video signaling method in U.S. Pat. No. 4,807,031 that encodes a message by modulating the relative luminance of the two fields comprising a video frame. While intended for use in interactive television, this method can also be used to encode a channel identification code. An obvious limitation is that this method cannot be used for radio broadcasts. Additionally, the television broadcast equipment must be altered to include the identification code insertion.

Passive signal recognition techniques have been developed for the identification of prerecorded audio and video sources. These systems use the features of the signal itself as the identification key. The unknown signal is then compared with a library of similarly derived features using a pattern recognition procedure. One of the earliest works in this area is presented by Moon et al. in U.S. Pat. No. 3,919,479. Moon teaches that correlation functions can be used to identify audio segments by matching them with replicas stored in a database. Moon also describes the method of extracting sub-audio envelope features. These envelope signals are more robust than the audio itself, but Moon's approach still suffers from sensitivity to distortion and speed errors.

A multiple stage pattern recognition system is described by Kenyon et al. in U.S. Pat. No. 4,843,562. This method uses low-bandwidth features of the audio signal to quickly determine which patterns can be immediately rejected. Those that remain are subjected to a high-resolution correlation with time warping to compensate for speed errors. This system is intended for use with a large number of candidate patterns. The algorithms used are too complex to be used in a portable survey system.

Another representative passive signal recognition system and method is disclosed by Lamb et al. in U.S. Pat. No. 5,437,050. Lamb performs a spectrum analysis based on the semitones of the musical scale and extracts a sequence of measurements forming a spectrogram. Cells within this spectrogram are determined to be active or inactive depending on the relative power in each cell. The spectrogram is then compared to a set of reference patterns using a logical procedure to determine the identity of the unknown input. This technique is sensitive to speed variation and even small amounts of distortion.

Kiewit et al. have devised a system specifically for the purpose of conducting automatic audience surveys as disclosed in U.S. Pat. No. 4,697,209. This system uses trigger events such as scene changes or blank video frames to determine when features of the signal should be collected. When a trigger event is detected, features of the video waveform are extracted and stored along with the time of occurrence in a local memory. These captured video features are periodically transmitted to a central site for comparison with a set of reference video features from all of the possible television signals. The obvious shortcoming of this system is that it cannot be used to conduct audience surveys of radio broadcasts.

The present invention combines certain aspects of several of the above inventions, but in a unique and novel manner to define a system and method that is suited to conducting audience surveys of both radio and television broadcasts.

SUMMARY OF THE INVENTION

It is an objective of the present invention to provide a method and apparatus for conducting audience surveys of radio and television broadcasts. This is accomplished using a number of body-worn portable monitoring units. These units periodically sample the acoustic environment of each survey member using a microphone. The audio signal is digitized and features of the audio are extracted and compressed to reduce the amount of storage required. The compressed audio features are then marked with the time of acquisition and stored in a local memory.

A central computer extracts features from the audio of radio and television broadcast stations using direct connection to a group of receivers. The audio is digitized and features are extracted in the same manner as for the portable monitoring units. However, the features are extracted continuously for all broadcast sources in a market. The feature streams are compressed, time-marked and stored on the central computer disk drives.

When the portable monitoring units assigned to survey members are not being worn (or carried), they are stored in docking stations that recharge the batteries and also provide modems and telephone access. On a daily basis, or every several days, the central computer interrogates the docked portable monitoring unit using the modem and transfers the stored feature packets to the central computer for analysis. This is done late at night or early in the morning when the portable monitoring unit is not in use and the phone line is available.

In addition to transferring the feature packets, the current time marker is transferred from the portable monitoring unit to the central computer. By comparing the current time marker with the time marker transferred during the last interrogation the central computer can determine the apparent elapsed time as seen by the portable monitoring unit. The central computer then makes a similar calculation based on the absolute time of interrogation and the previous interrogation time. The central computer can then perform the necessary interpolations and time translations to synchronize the feature data packets received from the portable monitoring unit with feature data stored in the central computer.

By comparing the audio feature data collected by a portable monitoring unit with the broadcast audio features collected at the central computer site, the system can determine which broadcast station the survey member was listening to at a particular time. This is accomplished by computing cross-correlation functions for each of three audio frequency bands between the unknown feature packet and features collected at the same time by the central computer for many different broadcast stations. The fast correlation method based on the FFT algorithm is used to produce a set of normalized correlation values spanning a time window of approximately six seconds. This is sufficient to cover residual time synchronization errors between the portable monitoring unit and the central computer. The correlation functions for the three frequency bands will each have a value of +1.0 for a perfect match, 0.0 for no correlation, and −1.0 for an exact opposite. These three correlation functions are combined to form a figure of merit that is a three dimensional Euclidean distance from a perfect match. This distance is calculated as the square root of the sum of the squares of the individual distances, where the individual distance is equal to (1,0-correlation value). In this representation, a perfect match has a distance of zero from the reference pattern. In an improved embodiment of the invention the contributions of each of the features is weighted according to the relative amplitudes of the feature waveforms stored in the central computer database. This has the effect of assigning more weight to features that are expected to have a higher signal-to-noise ratio.

The minimum value of the resulting distance is then found for each of the candidate patterns collected from the broadcast stations. This represents the best match for each of the broadcast stations. The minimum of these is then selected as the broadcast source that best matches the unknown feature packet from the portable monitoring unit. If this value is less than a predetermined threshold, the feature packet is assumed to be the same as the feature data from the corresponding broadcast station. The system then makes the assertion that the survey member was listening to that radio or television station at that particular time.

By collecting and processing these feature packets from many survey members in the context of many potential broadcast sources, comprehensive audience surveys can be conducted. Further, this can be done faster and more accurately than was possible using previous methods.

DESCRIPTION OF THE DRAWINGS

The features, objects, and advantages of the present invention will become more apparent from the detailed description set forth below when taken in conjunction with the following drawings.

The digital signal processor then reads samples from the analog to digital converter and extracts features from the audio waveform. The audio features are then compressed and stored in a non-volatile memory. Compressed feature packets with time tags are later transferred through a docking station to the central computer. A rechargeable battery is also included.

Figure 3:
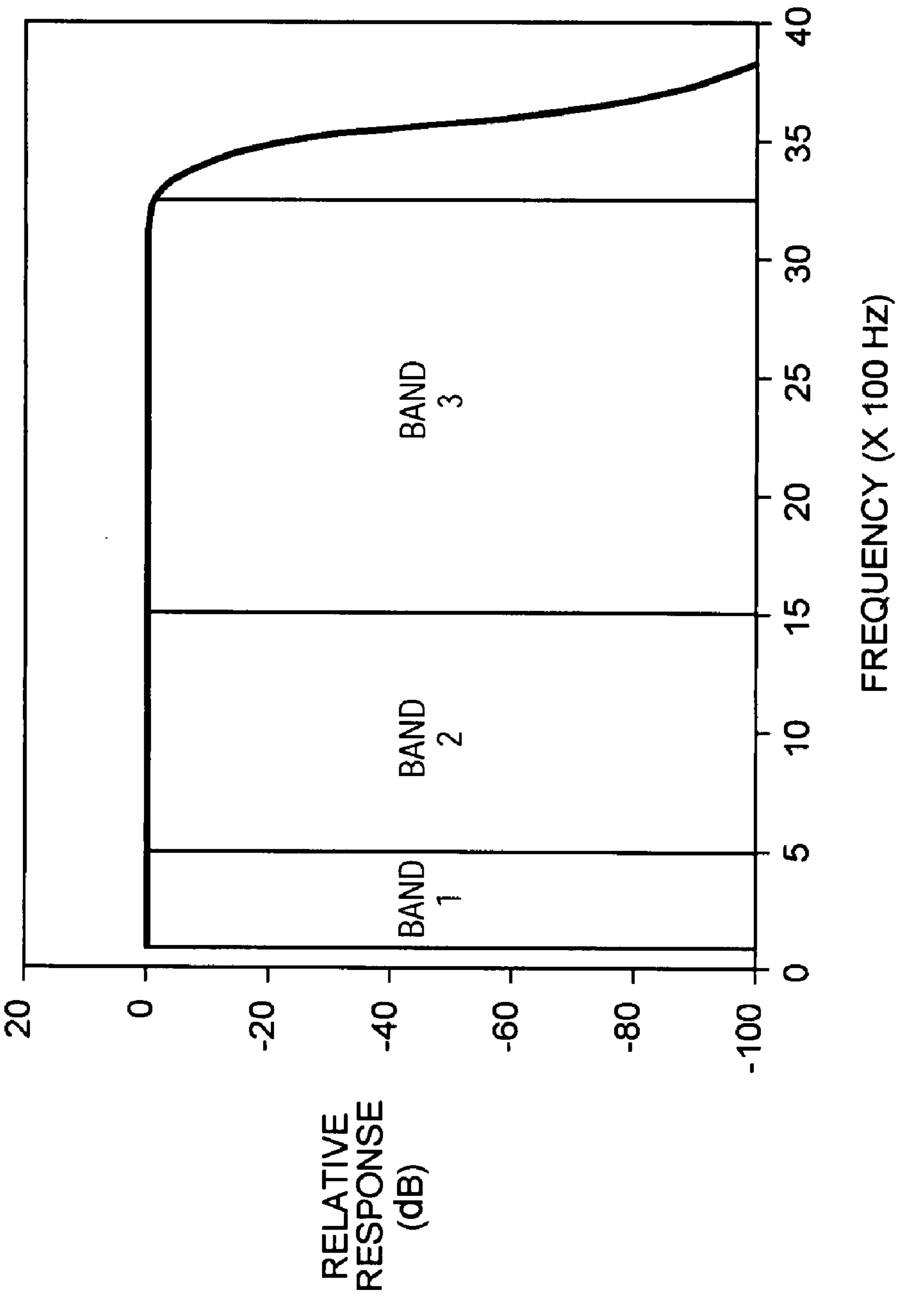

FIG. 3 shows the three frequency bands that are used for feature extraction in a particularly preferred embodiment of the present invention. The energy in each of these three frequency bands is sampled approximately ten times per second to produce feature waveforms.

Figure 4:
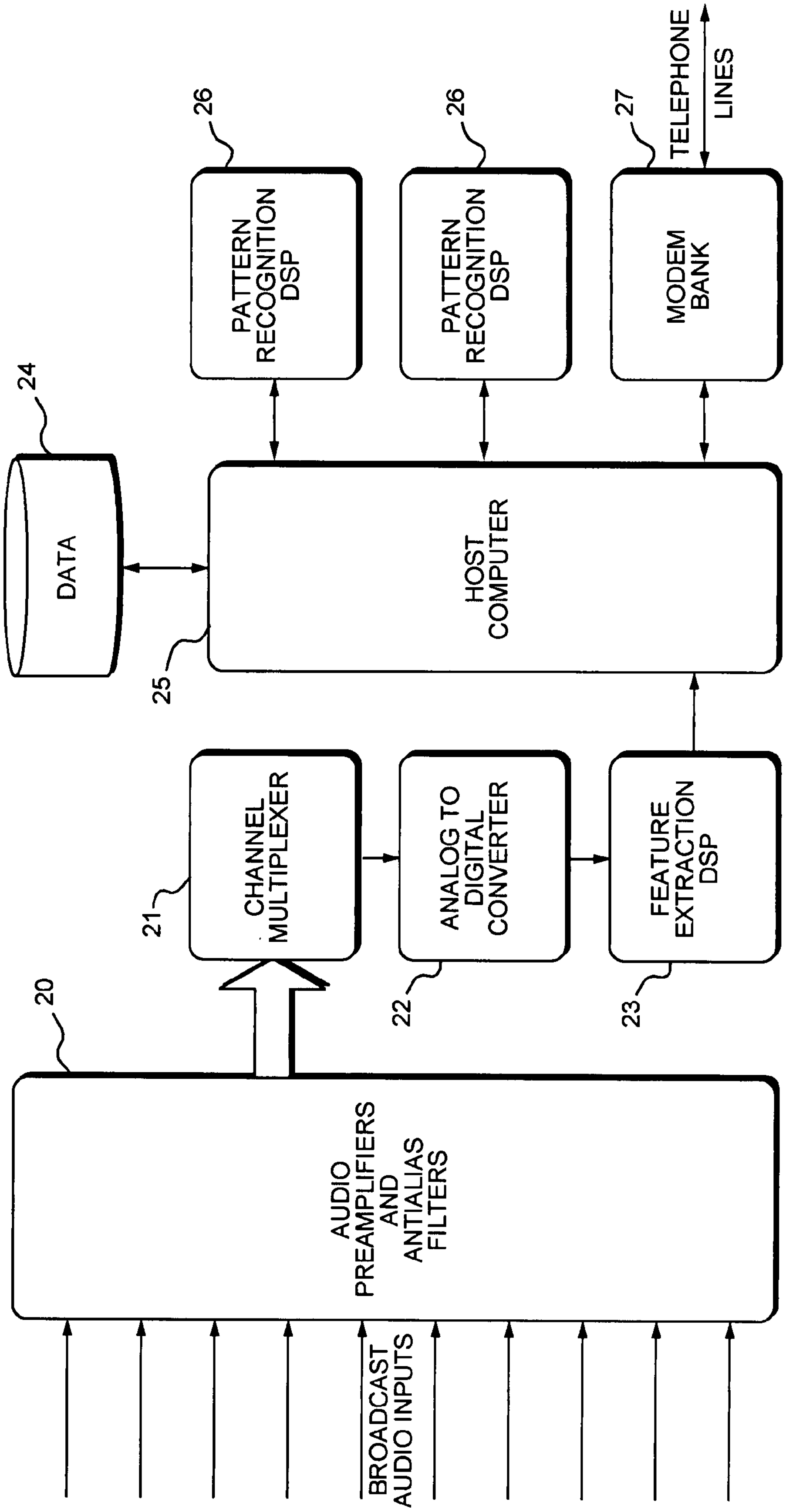

FIG. 4 illustrates the major components of the central computer that continuously captures broadcast audio from multiple receivers and matches feature packets from portable units with possible broadcast sources. A set of audio amplifiers and lowpass antialias filters provide appropriate gain and restrict the audio frequencies to a little over 3 kHz. A channel multiplexer rapidly scans the filter outputs and transfers the waveforms sequentially to an analog to digital converter producing a multiplexed digital time series. A digital signal processor performs a spectrum analysis and produces energy measurements of each of three frequency bands from each of the input channels. These feature samples are then transferred to a host computer and stored for later comparison. The host computer contains a bank of modems that are used to interrogate the portable monitor units while they are docked. Feature data packets are transferred from the portable units during this interrogation. One or more digital signal processors are connected to the host computer to perform the feature pattern recognition process that identifies which broadcast channel, if any, matches the unknown feature packets from the portable monitoring units.

Figure 5:
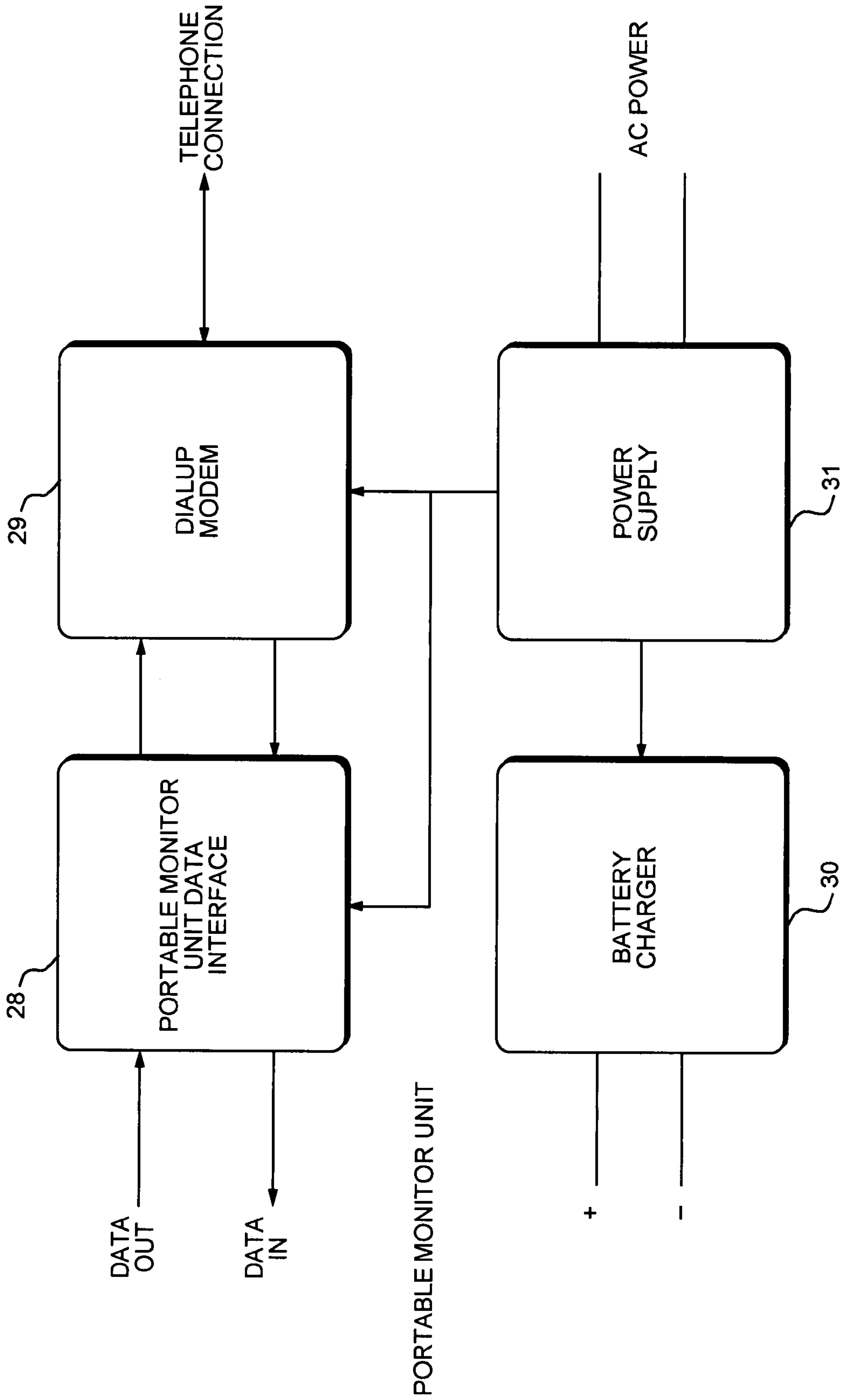

FIG. 5 is a block diagram of the docking station for the portable monitor unit. The docking station contains four components. The first component is a data interface that connects to the portable unit. This interface may include an electrical connection or an infrared link. The data interface connects to a modem that allows telephone communication and transfer of data. A battery charger in the docking station is used to recharge the battery in the portable unit. A modular power supply is included to provide power to the other components.

Figure 6:
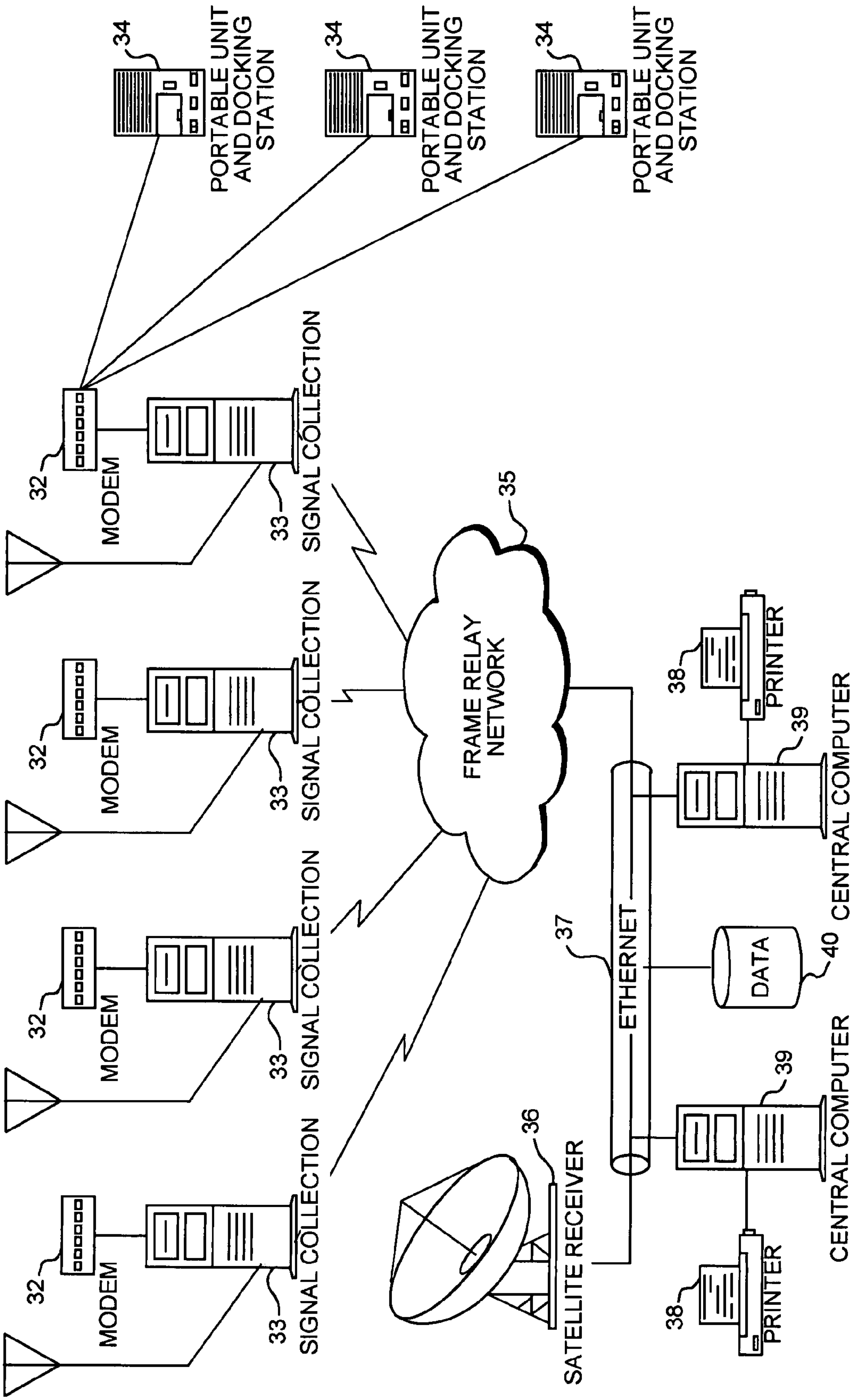

FIG. 6 illustrates an expanded survey system that is intended to operate in multiple cities or markets. A wide area network connects a group of remotely located signal collection systems with a central site. Each of the signal collection systems captures broadcast audio in its region and stores features. It also interrogates the portable monitoring units and gathers the stored feature packets. Data packets from the remote sites are transferred to the central site for processing.

Figure 7:
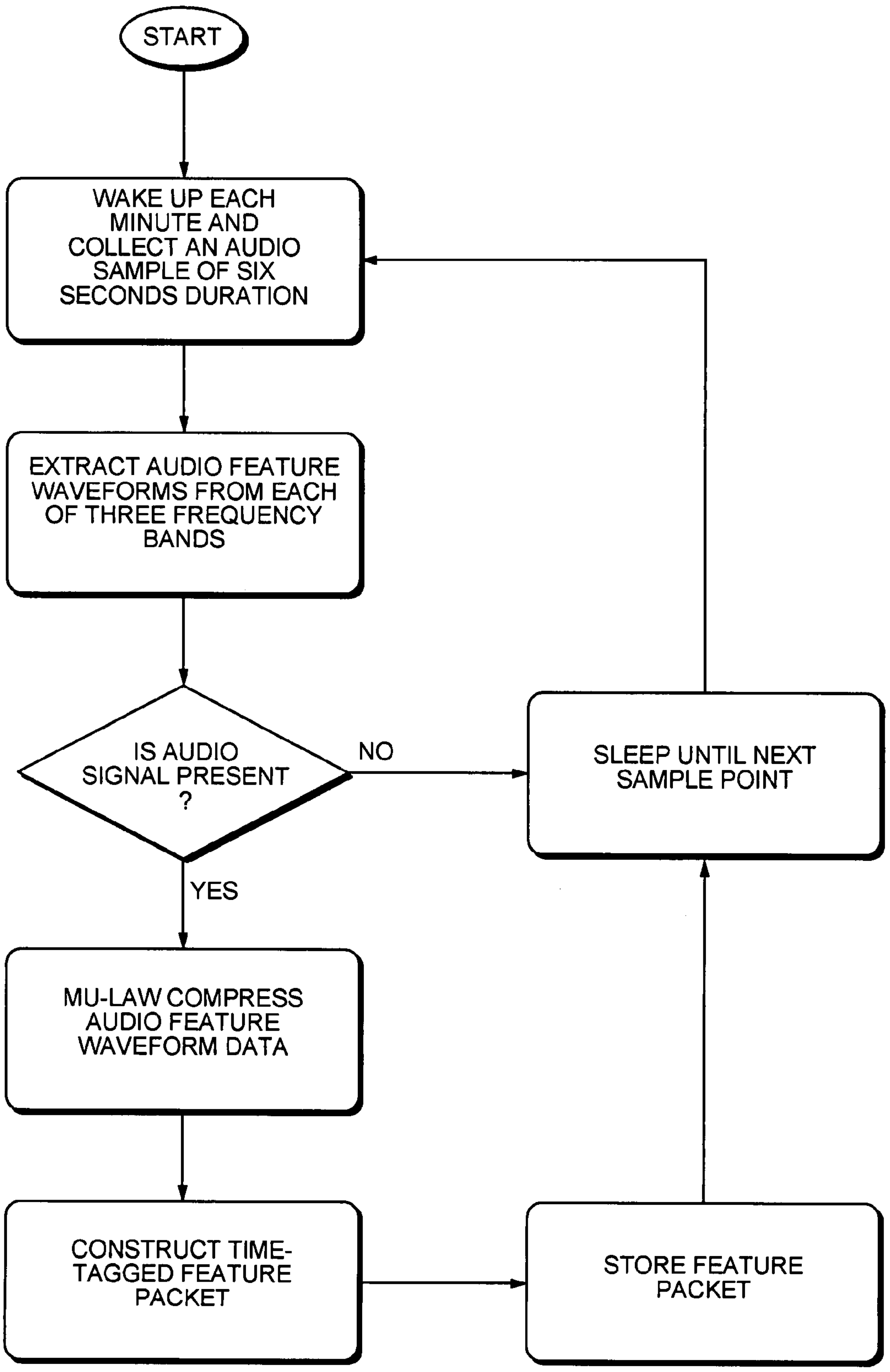

FIG. 7 is a flow chart of the audio signal acquisition strategy for the portable monitoring units. The portable monitoring units activate periodically and compute features of the audio in the environment. If there is sufficient audio power the features are compressed and stored.

Figure 8:
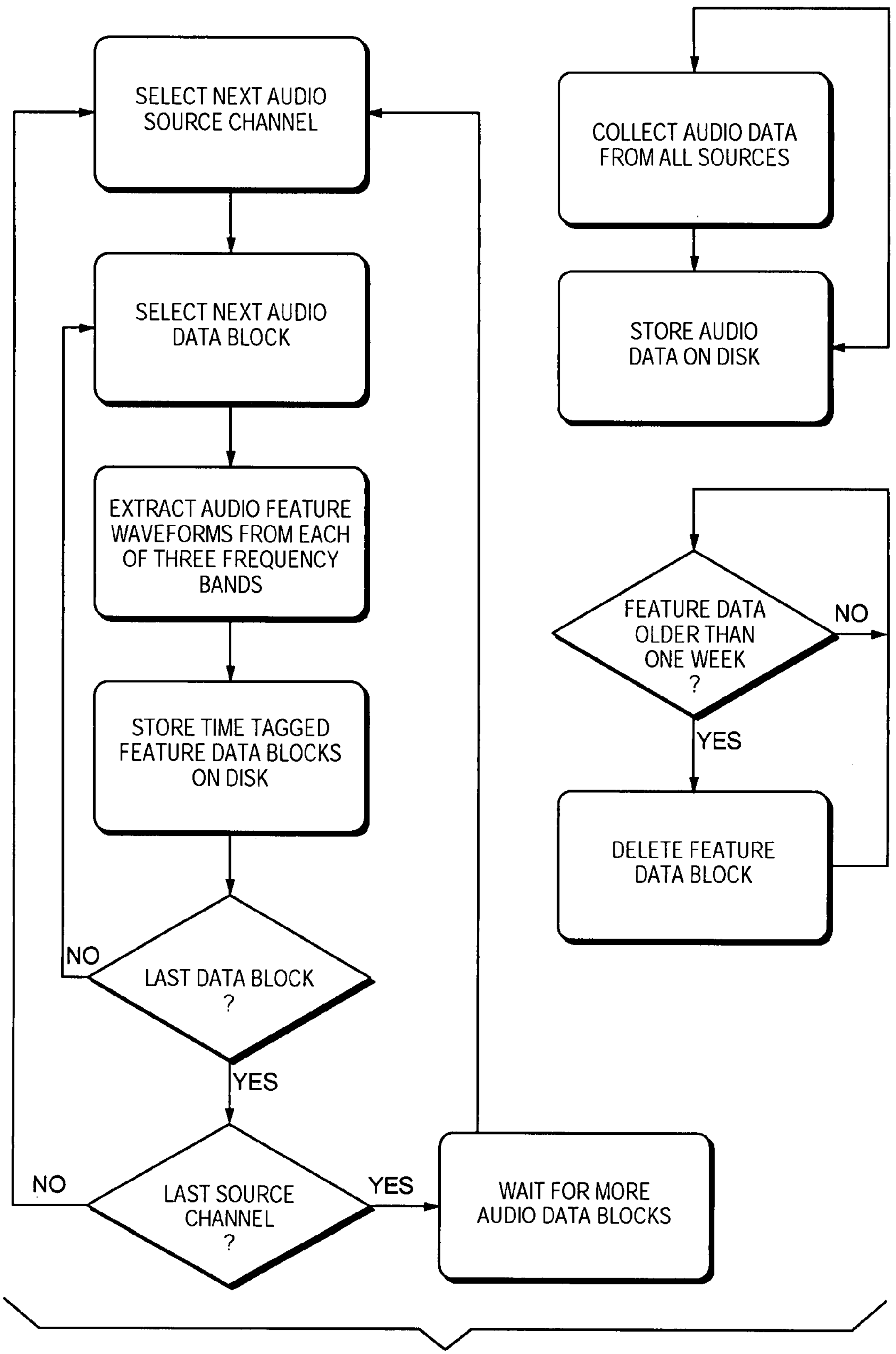

FIG. 8 is a flow chart of procedures used to collect and manage audio features received at central collection sites. This includes the three separate processes of audio collection, feature extraction, and deletion of old feature data.

Figure 9:
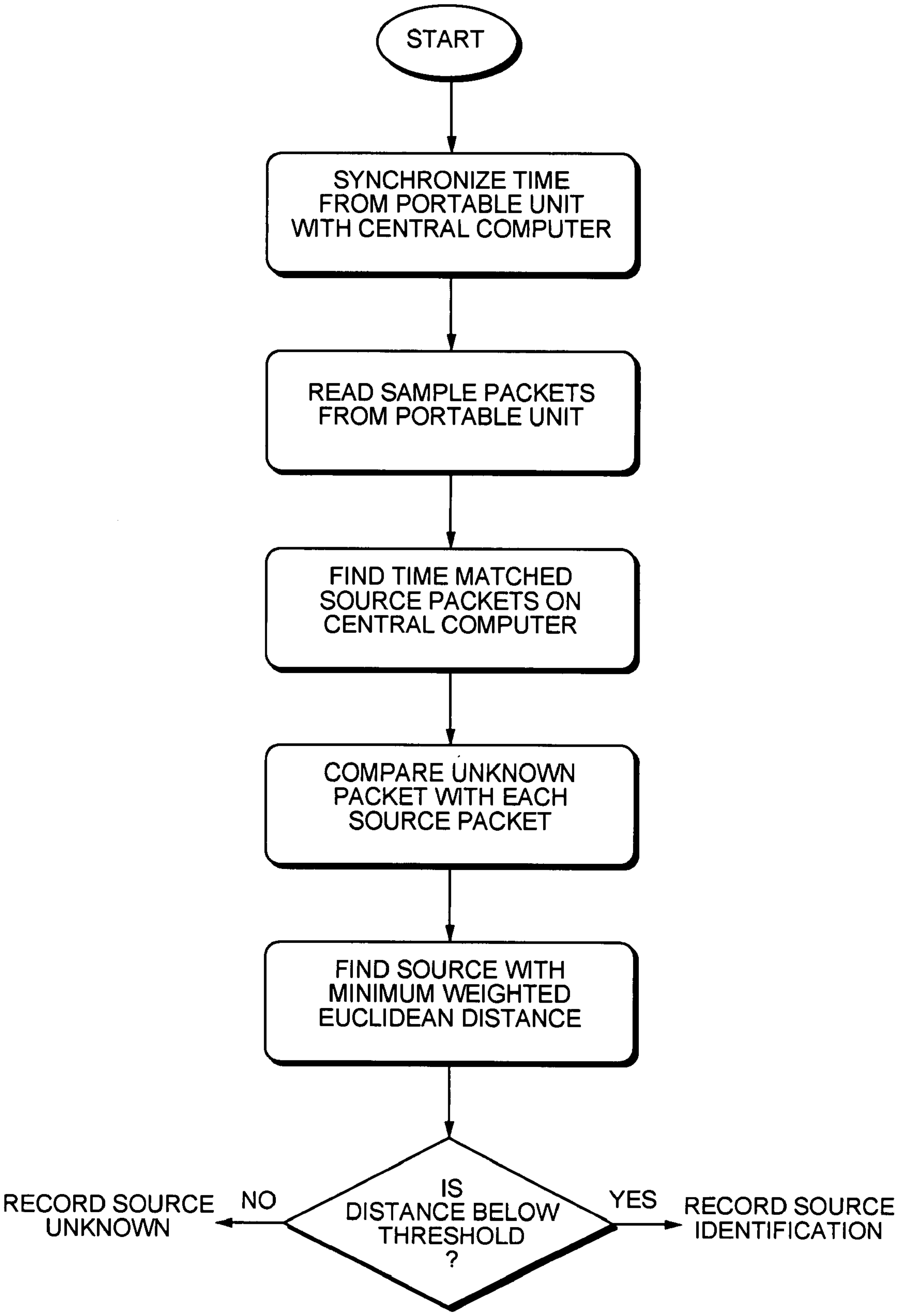

FIG. 9 is a flow chart of the packet identification procedure. Packets are first synchronized with the database. Corresponding data blocks from broadcast audio sources are then matched to find the minimum weighted Euclidean distance to the unknown packet. If this distance is less than a threshold, the unknown packet is identified as matching the broadcast.

Figure 10:
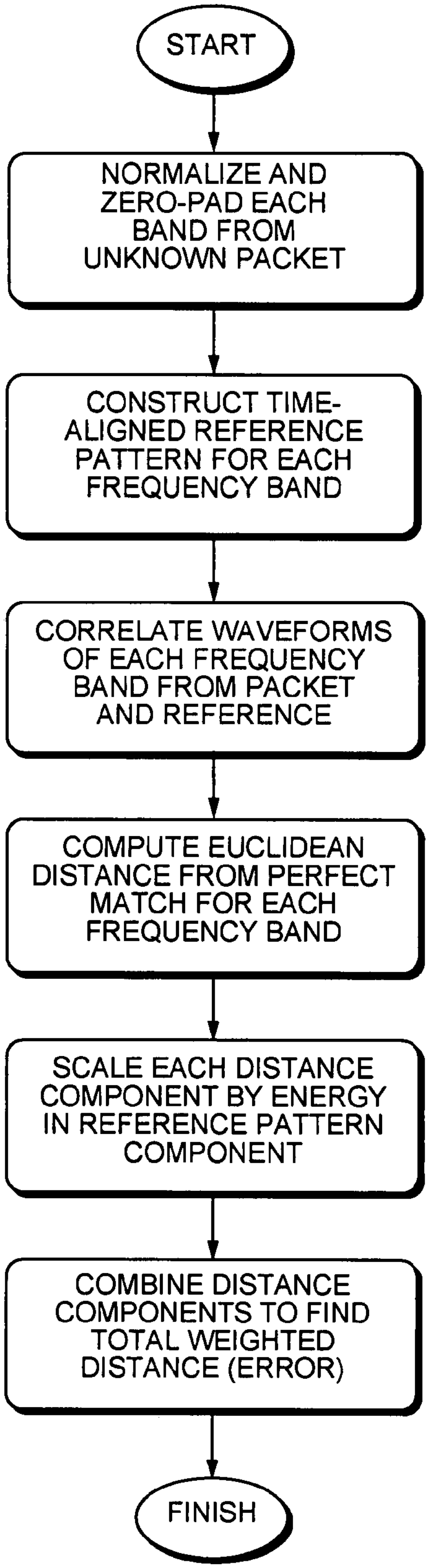

FIG. 10 is a flow chart of the pattern matching procedure. Unknown feature packets are first zero padded to double their length and then correlated with double length feature segments taken from the reference features on the central computer. The weighted Euclidean distance is then computed from the correlation values and the relative amplitudes of the features stored in the reference patterns.

Figure 11:
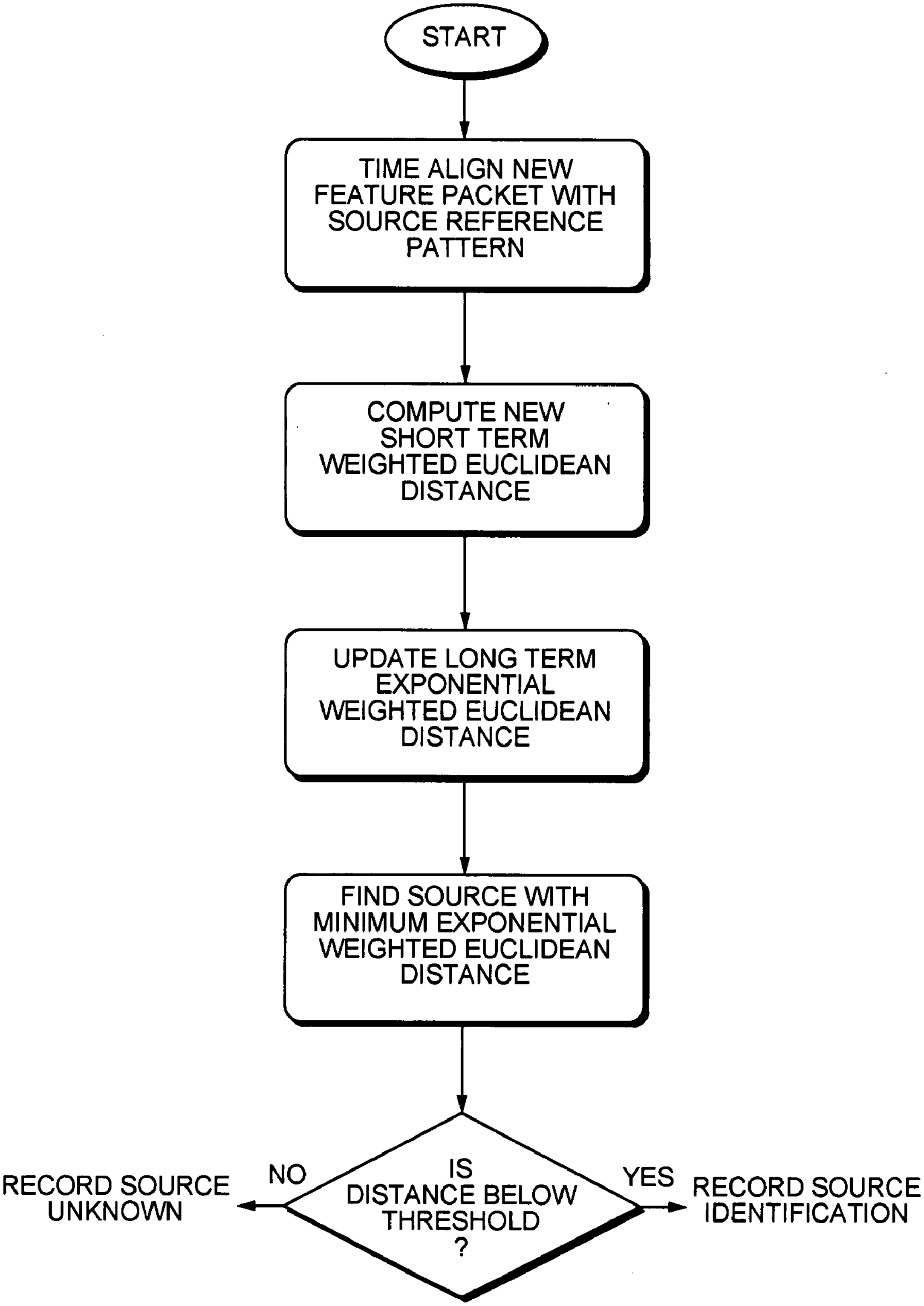

FIG. 11 illustrates the process of averaging successive weighted distances to improve the signal-to-noise ratio and reduce the false detection rate. This is an exponential process where old data have a smaller effect than new data.

DETAILED DESCRIPTION OF THE PREFERRED EMBODIMENT

The audience measurement system according to the invention consists of a potentially large number of body-worn portable collection units 4 and several central computers 7 located in various markets. The portable monitoring units 4 periodically sample the audio environment and store features representing the structure of the audio presented to the wearer of the device. The central computers continuously capture and store audio features from all available broadcast sources 1 through direct connections to radio and television receivers 6. The central computers 7 periodically interrogate the portable units 4 while they are idle in docking stations 10 at night via telephone connections and modems 9. The sampled audio feature packets are then transferred to the central computers for comparison with the broadcast sources. When a match is found, the presumption is that the wearer of the portable unit was listening to the corresponding broadcast station. The resulting identification statistics are used to construct surveys of the listening habits of the users.

In typical operation, the portable monitoring units 4 compress the audio feature samples to 200 bytes per sample. Sampling at intervals of one minute, the storage requirements are 200 bytes per minute or 12 kilobytes per hour. During quiet intervals, feature packets are not stored. It is estimated that about 50 percent of the samples will be quiet. The average storage requirement is therefore about 144 kilobytes per day or approximately 1 Megabyte per week. The portable monitoring units are capable of storing about one month of compressed samples.

If the portable monitoring units are interrogated daily, approximately one minute will be required to transfer the most recent samples to a central computer or collection site. The number of modems 9 required at the central computer 7 or collection site 33 depends on the number of portable monitoring units 4.

In a single market or a relatively small region, a central computer 7 receives broadcast signals directly and stores feature data continuously on its local disk 8. Assuming that on average a market will have 10 TV stations and 50 radio stations, the required storage is about 173 Megabytes per day or 1210 Megabytes per week. Data older than one week is deleted. Obviously, as more sources are acquired through, e.g., satellite network feeds and cable television, the storage requirements increase. However, even with 500 broadcast sources the system needs only 10 Gigabytes of storage for a week of continuous storage.

The recognition process requires that the central computer 7 locate time intervals in the stored feature blocks that are time aligned (within a few seconds) with the unknown feature packet. Since each portable monitoring unit 4 produces one packet per minute, the processing load with 500 broadcast sources is 500 pattern matches per minute or about 8 matches per second for each portable monitoring unit. Assuming that there are 500 portable monitoring units in a market the system must perform about 4000 matches per second.

When deployed on a large scale in many markets the overall system architecture is somewhat different as is illustrated in FIG. 6. There are separate remote signal collection computers 33 installed in each city or market. The remote computers 33 record the broadcast sources in their particular markets as described above. In addition, they interrogate the portable monitoring units 34 in their area by modem 32 and download the collected feature packets. The signal collection computers 33 are connected to a central site by a wide area data communication network 35. The central computer site consists of a network 37 of computers 39 that can share the pattern recognition processing load. The local network 37 is connected to the wide area network 35 to allow the central site computers 39 to access the collected feature packets and broadcast feature data blocks. In operation, a central computer 39 downloads a day's worth of feature packets from a portable monitoring unit 34 that have been collected by one of the remote computers 33 using modems 32. Broadcast time segments that correspond to the packet times are then identified and transferred to the central site. The identification is then performed at the central site. Once an initial identification has been made, it is confirmed by matching subsequent packets with broadcast source features from the same channel as the previous recognition. This reduces the amount of data that must be transferred from the remote collection computer to the central site. This is based on the assumption that a listener will continue to listen (or stay tuned) to the same station for some amount of time. When a subsequent match fails, the remaining channels are downloaded for pattern recognition. This continues until a new match has been found. The system then reverts to the single-channel tracking mode.

The above process is repeated for all portable monitoring units 34 in all markets. In instances where markets overlap, feature packets from a particular portable unit can be compared with data from each market. This is accomplished by downloading the appropriate channel data from each market. In addition, signals that are available over a broad area such as satellite feeds, direct satellite broadcasts, etc. are collected directly at the central site using one or more satellite receivers 36. This includes many sources that are distributed over cable networks such as movie channels and other premium services. This reduces the number of sources that must be collected remotely (and redundantly) by the signal collection computers.

An additional capability of this system configuration is the ability to match broadcast sources in different markets. This is useful where network affiliates may have several different; selections of programming.

Figure 1:
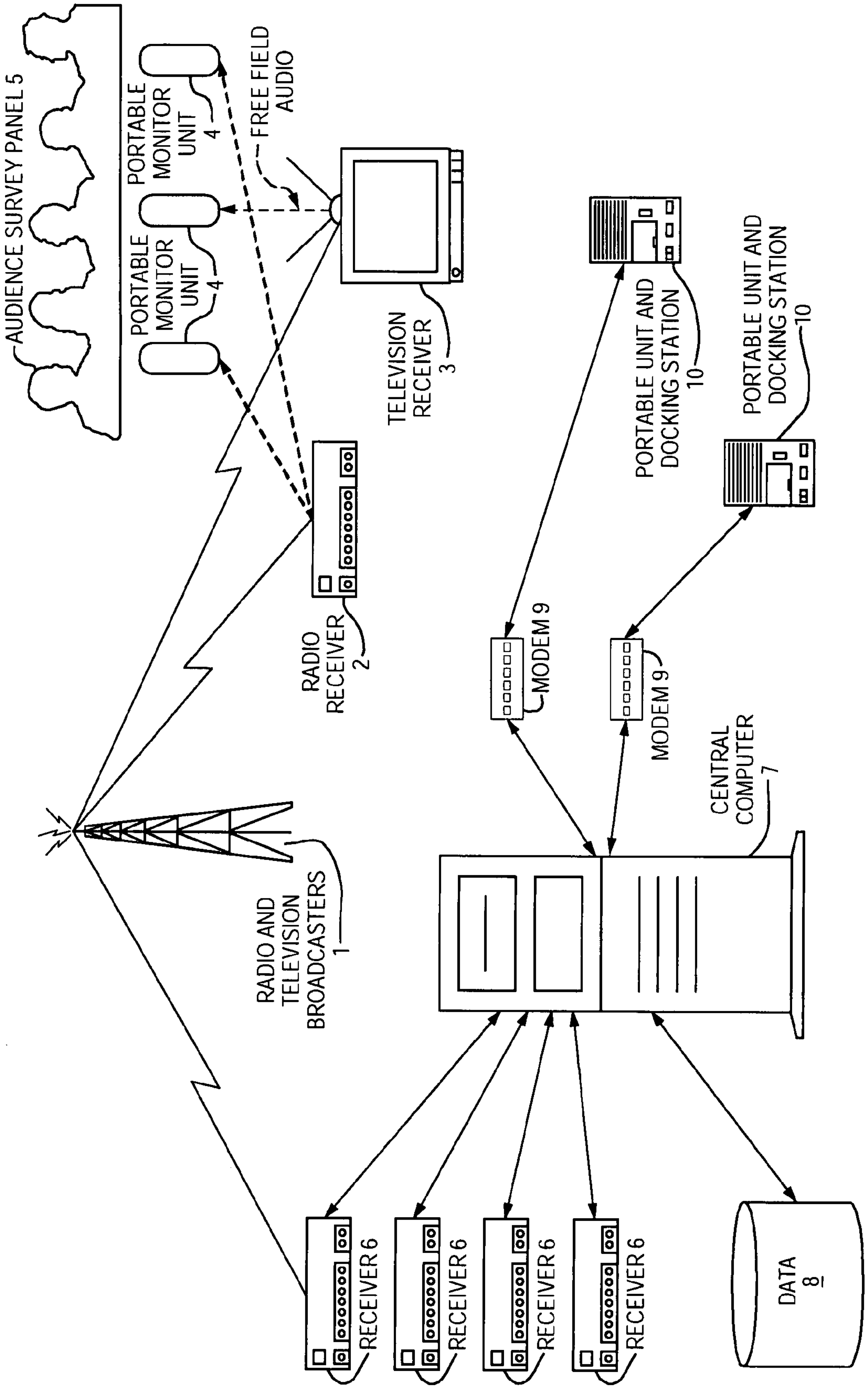
FIG. 1 illustrates the functional components of the invention and how they interact to function as an audience measurement system. Audience survey panel members wear portable monitor units that collect samples of audio in their environment. This includes audio signals from broadcast radio and television receivers. The radio and television broadcast signals in a survey market are also received by a set of receivers connected to a central computer. Audio features from all of the receivers are recorded in a database on the central computer. When not in use, portable monitor units are placed in docking stations where they can be interrogated by the central computer via dialup modems. Audio feature samples transferred from the portable monitor units are then matched with audio features of multiple broadcast stations stored in the database. This allows the system to determine which radio and television programs are being viewed or heard by each panel member.
Figure 2:
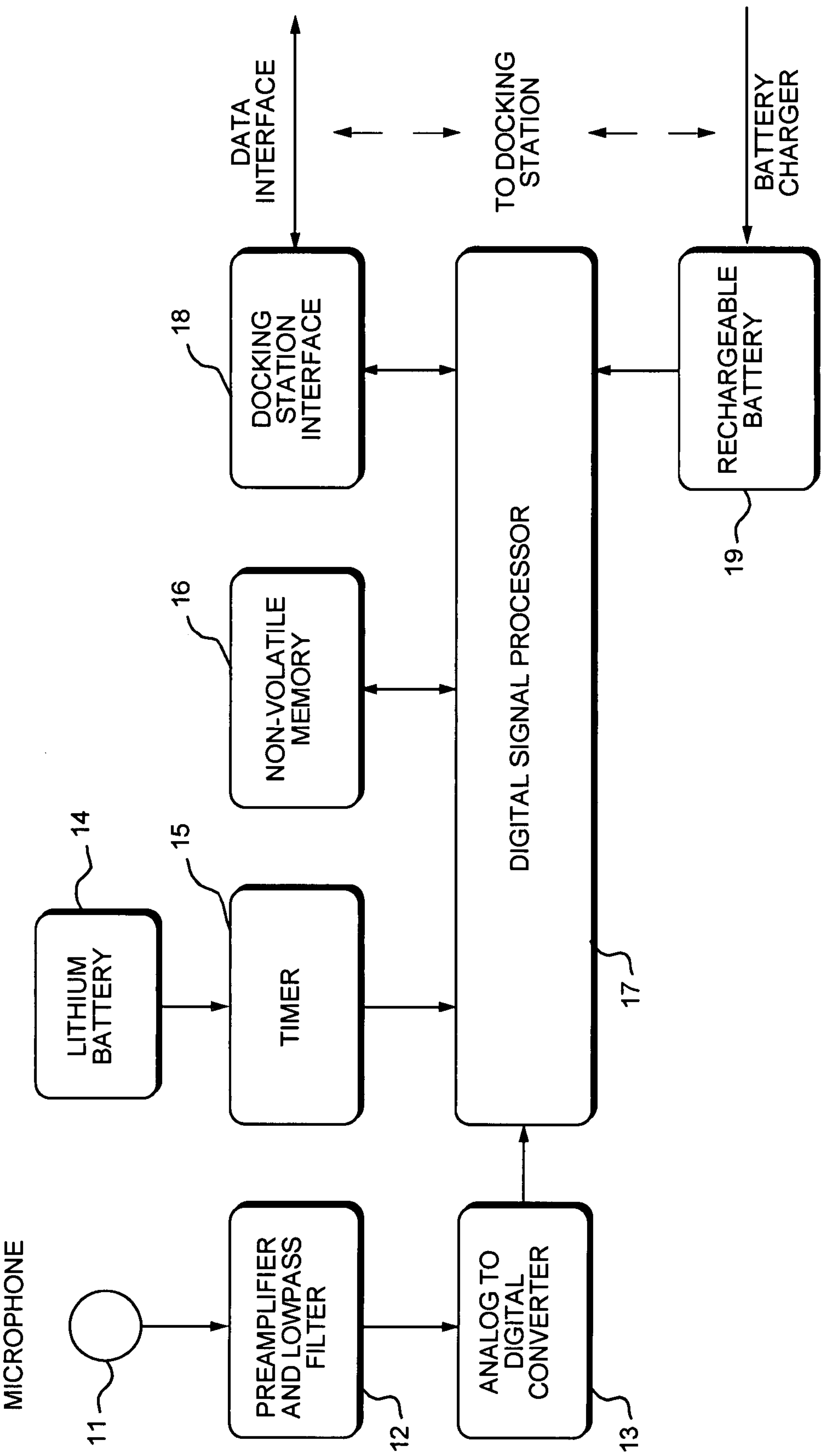
FIG. 2 is a block diagram of a portable monitor unit. The portable monitoring unit contains a microphone for gathering audio. This audio signal is amplified and lowpass filtered to restrict frequencies to a little over 3 kHz. The filtered signal is then digitized using an analog to digital converter. Waveform samples are then transferred to a digital signal processor. A low-power timer operating from a separate lithium battery activates the digital signal processor at intervals of approximately one minute. It will be understood by those skilled in the art that the digital processor can collect the samples at any period interval, and that use of a one-minute period is a matter of design choice and should not be considered as limiting of the scope of the invention.

In the preferred embodiment of the portable monitoring unit shown in FIG. 2 the audio signal received by small microphone 11 in a portable unit is amplified, lowpass filtered, and digitized by an analog to digital converter 13. The sample rate is 8 kilosamples per second, resulting in a Nyquist frequency of 4 kHz. To avoid alias distortion, an analog lowpass filter 12 rejects frequencies greater than about 3.2 kHz. The analog to digital converter 13 sends the audio samples to a digital signal processing microprocessor 17 that performs the audio processing and feature extraction. The first step in this processing is spectrum analysis and partitioning of the audio spectrum into three frequency bands as shown in FIG. 3.

The frequency bands have been selected to contain approximately equal power on average. In one embodiment, the frequency bands are:

Band 1: 50 Hz-500 Hz

Band 2: 500 Hz-1500 Hz

Band 3: 1500 Hz-3250 Hz

It will be understood by those skilled in the art that other frequency bands may be used to implement the teachings of the present invention.

The spectrum analysis is performed by periodically performing Fast Fourier Transforms (FFT's) on blocks of 64 samples. This produces spectra containing 32 frequency "bins". The power in each bin is found by squaring its magnitude. The power in each band is then computed as the sum of the power in the corresponding bins frequency. A magnitude value is then computed for each band by taking the square root of the integrated power. The mean value of each of these streams is then removed by using a recursive high-pass filter. The data rate and bandwidth must then be reduced. This is accomplished using polyphase decimating lowpass filters. Two filter stages are employed for each of the three feature streams. Each of these filters reduces the sample rate by a factor of five, resulting in a sample rate of 10 samples per second (per stream) and a bandwidth of about 4 Hz. These are the audio data measurements that are used as features in the pattern recognition process.

A similar process is performed at the central computer site as shown in FIG. 4. However, audio signals are obtained from direct connections to radio and television broadcast receivers. Since many audio sources must be collected simultaneously, a set of preamplifiers and analog lowpass filters 20 is included. The outputs of these filters are connected to a channel multiplexer 21 that switches sequentially between each audio signal and sends samples of these signals to the analog to digital converter 22. A digital signal processor 23 then operates on all of the audio time series waveforms to extract the features.

To reduce the storage requirements in both the portable units and the central computers, the system employs mu-law compression of the feature data. This reduces the data by a factor of two, compressing a 16-bit linear value to an eight bit logarithmic value. This maintains the full dynamic range while retaining adequate resolution for accurate correlation performance. The same feature processing is used in both the portable monitoring units and the central computers. However, the portable monitoring units capture brief segments of 64 feature samples at intervals of approximately one minute as triggered by a timer in the portable monitoring unit. Central computers record continuous streams of feature data.

The portable monitoring unit is based on a low-power digital signal processor of the type that is frequently used in such applications as audio processing for digital cellular telephones. Most of the time this processor is in an idle or sleep condition to conserve battery power. However, an electronic timer operates continuously and activates the DSP at intervals of approximately one minute. The DSP 17 collects about six seconds of audio from the analog to digital converter 13 and extracts audio features from the three frequency bands as described previously. The value of the timer 15 is also read for use in time marking the collected signals. The portable monitoring unit also includes a rechargeable battery 19 and a docking station data interface 18.

In addition to the features that are collected, the total audio power present in the six-second block is computed to determine if an audio signal is present. The audio signal power is then compared with an activation threshold. If the power is less than the threshold the collected data are discarded, and the DSP 17 returns to the inactive state until the next sampling interval. This avoids the need to store data blocks that are collected while the user is asleep or in a quiet environment. If the audio power is greater than the threshold, then the data block is stored in a non-volatile memory 16.

Feature data to be stored are organized as 64 samples of each of the three feature streams. These data are first mu-law compressed from 16 bit linear samples to 8 bit logarithmic samples. The resulting data packets therefore contain 192 data bytes. The data packets also contain a four-byte unit identification code and a four-byte timer value for a total of 200 bytes per packet. The data packets are stored in a non-volatile flash memory 16 so that they will be retained when power is not applied. After storing the data packet, the unit returns to the sleep-state until the next sampling interval. This procedure is illustrated in flow-chart form in FIG. 7.

FIG. 5 is a block diagram of the portable unit docking station 10. The docking station includes a data interface 28 to the portable unit 4 and a dialup modem 29 that is used to communicate with modems 9 that are connected to the central computer 7. An AC power supply 31 supplies power to the docking station and also powers a battery charger 30 that is used to recharge the battery 19 in the portable monitoring unit 4.

When the portable monitoring unit 4 is in its docking station 10 and communicates with a central computer 7, packets are transferred in reverse order. That is, the newest data packets are transferred first, proceeding backwards in time. The central computer continues to transfer packets until it encounters a packet that has been previously transferred.

Each portable monitoring unit 4 optionally includes a motion detector or sensor (not shown) that detects whether or not the device is actually been worn or carried by the user. Data indicating movement of the device is then stored (for later downloading and analysis) along with the audio feature information described above. In one embodiment, audio feature information is discarded or ignored in the survey process if the output of the motion detector indicated that the device 4 was not actually been worn or carried during a significant period of time when the audio information was being recorded.

Each portable monitoring unit 4 also optionally includes a receiver (not shown) used for determining the position of the unit (e.g., a GPS receiver, a cellular telephone receiver, etc.). Data indicating position of the device is then stored (for later downloading and analysis) along with the audio feature information described above. In one embodiment, the downloaded position information is used by the central computer to determine which signal collection station's features to access for comparison.

In contrast with the portable monitoring units that sample the audio environment periodically, the central computer must operate continuously, storing feature data blocks from many audio sources. The central computer then compares feature packets that have been downloaded from the portable units with sections of audio files that occurred at the same date and time. There are three separate processes operating in the data collection and storage aspect of central computer operation. The first of these is the collection and storage of digitized audio data and storage on the disks 8 of the central computer. The second task is the extraction of feature data and the storage of time-tagged blocks of feature data on the disk. The third task is the automatic deletion of feature files that are old enough that they can be considered to be irrelevant (one week). These processes are illustrated in FIG. 8.

Audio signals may be received from any of a number of sources including broadcast radio and television, satellite distribution systems, subscription services, and the internet. Digitized audio signals are stored for a relatively short time (along with time markers) on the central computer pending processing to extract the audio features. It is frequently beneficial to directly compute the features in real-time using special purpose DSP boards that combine analog to digital conversion with feature extraction. In this case the temporary storage of raw audio is greatly reduced.

The audio feature blocks are computed in the same manner as for the portable monitoring units. The central computer system 7 selects a block of audio data from a particular channel or source and performs a spectrum analysis. It then integrates the power in each of three frequency bands and outputs a measurement. Sequences of these measurements are lowpass filtered and decimated to produce a feature sample rate of 10 samples per second for each of the three bands. Mu-law compression is used to produce logarithmic amplitude measurements of one byte each, reducing the storage requirements. Feature samples are gathered into blocks, labeled with their source and time, and stored on the disk. This process is repeated for all available data blocks from all channels. The system then waits for more audio data to become available.

In order to control the requirement for disk file storage, feature files are labeled with their date and time of initiation. For example, a file name may be automatically constructed that contains the day of the week and hour of the day. An independent task then scans the feature storage areas and deletes files that are older than a specified amount. While the system expects to interrogate portable monitoring units on a daily basis and to compare their collected features with the data base every day, there will be cases where it will not be possible to interrogate some of the portable units for several days. Therefore, feature data are retained at the central computer site for about a week. After that, the results will no longer be useful.

When the central computer 7 compares audio feature blocks stored on its own disk drive 8 with those from a portable monitoring unit 4, it must match its time markers with those transferred from the portable monitoring unit. This reduces the amount of searching that must be done, improving the speed and accuracy of the processing.

Each portable monitoring unit 4 contains its own internal clock 15. To avoid the need to set this clock or maintain any specific calibration, a simple 3 2-bit counter is used that is incremented at a 10 Hz rate. This 10 Hz signal is derived from an accurate crystal oscillator. In fact, the absolute accuracy of this oscillator is not very important. What is important is the stability of the oscillator. The central site interrogates each portable monitoring unit at intervals of between one day and once per week. As part of this procedure the central site reads the current value of the counter in the portable monitoring unit. It will also note its own time count and store both values. To synchronize time the system subtracts the time count that was read from the portable unit during the previous interrogation from the current value. Similarly, the system computes the number of counts that occurred at the central site (the official time) by subtracting its stored counter value from the current counter value. If the frequencies are the same, the same number of counts will have transpired over the same time interval (6.048 Million counts per week). In this case the portable unit 4 can be synchronized to the central computer 7 by adding the difference between the starting counts to the time markers that identify each audio feature measurement packet. This is the simplest case.

The typical case is where the oscillators are running at slightly different frequencies. It is still necessary to align the starting counter values, but the system must also compute a scale factor and apply it to time markers received from the portable monitoring unit. This scale factor is computed by dividing the number of counts from the central computer by the number of counts from the portable unit that occurred over the same time interval. The first order (linear) time synchronization requires computation of an offset and a scale factor to be applied to the time marks from the portable monitoring unit.

| | |
|---|---|
| Compute Offset | $Off = S_c - S_p$ |
| Compute Central Counts | $C_c = E_c - S_c$ |
| Compute Portable Counts | $C_p = E_p - S_p$ |
| Compute Scale Factor | $Scl = C_c/C_p$ |

Time markers can then be converted from the portable monitoring unit to the central computer frame of reference:

Convert Time Marker $T_c=(T_p+Off)*Scl$

The remaining concern is short-term drift of the oscillator in the portable monitoring unit. This is primarily due to temperature changes. The goal is to stay within one second of the linearly interpolated time. The worst timing errors occur when the frequency deviates in one direction and then in the opposite direction. However, it has been determined that stability will be adequate over realistic temperature ranges.

The audience survey system includes pattern recognition algorithms that determine which of many possible audio sources was captured by a particular portable monitoring unit 4 at a certain time. To accomplish this with reasonable hardware cost, the central computers 7 preferably employ high performance PC's 25 that have been augmented by digital signal processors 26 that have been optimized to perform functions such as correlations and vector operations. FIG. 9 summarizes the signal recognition procedure.

As discussed previously, it is important to synchronize the time markers received from the portable monitoring units 4 with the time tags applied to feature blocks stored on the central computer systems 7. Once this has been done, the system should be able to find stored feature blocks that are within about one second from the feature packets received from the portable units. The tolerance for time alignment is about +/−3 seconds, leaving some room to deal with unusual situations. Additionally, the system can search for pattern matches outside of the tolerance window, but this slows down the processing. In cases where pattern matches are not found for a particular portable unit, the central computer can repeat all of the pattern matches using an expanded search window. Then when matches are found, their times of occurrence can be used as checkpoints to update the timing information. However, the need to resort to these measures may indicate a malfunction of the portable monitoring unit or its exposure to environmental extremes.

The pattern recognition process involves computing the degree of match with reference patterns derived from features of each of the sources. As shown in FIG. 9, this degree of match is measured as a weighted Euclidean distance in three-dimensional space. The distance metric indicates a perfect match as a distance of zero. Small distances indicate a closer match than large distances. Therefore, the system must find the source that produces the smallest distance to the unknown feature packet. This distance is then compared with a threshold value. If the distance is below the threshold, the system will report that the unknown packet matches the corresponding source and record the source identification. If the minimum distance is greater than the threshold, the system presumes that the unknown feature packet does not match any of the sources and record that the source is unknown.

The basic pattern matching procedure is illustrated in FIG. 10. Feature packets from a portable monitoring unit 4 contain 64 samples from each of the three bands. These must first be mu-law decompressed to produce 16 bit linear values. Each of the three feature waveforms is then normalized by dividing each value by the standard deviation (square root of power) computed over the three signals. This corrects for the audio volume to which the portable unit was exposed when the feature packet was collected. Each of the three normalized waveforms is then padded with a block of zeroes to a total length of 128 samples per feature band. This is necessary to take advantage of a fast correlation algorithm based on the FFT.

The system then locates a block of samples consisting of 128 samples of each feature as determined by the time alignment calculation. This will include the time offset needed to assure that the needed three second margins are present at the beginning and end of the expected location of the unknown packet. Next, the system calculates the cross-correlation functions between each of the three waveforms of the unknown feature packet and the corresponding source waveforms. In the fast correlation algorithm this requires that both the unknown and the reference source waveforms are transformed to the frequency domain using a fast Fourier transform. The system then performs a conjugate vector cross-product of the resulting complex spectra and then performs an inverse fast Fourier transform on the result. The resulting correlation functions are then normalized by the sliding standard deviation of each computed over a 64 sample window.

Each of the three correlation functions representing the three frequency bands have a maximum value of one for a perfect match to zero for no correlation to minus one for an exact opposite. Each of the correlation values is converted to a distance component by subtracting it from one. The Euclidean distance is preferably defined as set forth in equation (1) below as the square root of the sum of the squares of the individual components:

$$D=[(1-cv_1)^2+(1-cv_2)^2+(1-cv_3)^2]^{1/2} \quad (1)$$

This results in a single number that measures how well a feature packet matches the reference (or source) pattern, combining the individual distances as though they were based on measurements taken in three dimensional space. However, by virtue of normalizing the feature waveforms, each component makes an equal contribution to the overall distance regardless of the relative amplitudes of the audio in the three bands. In one embodiment, the present invention aims to avoid situations where background noise in an otherwise quiet band disturbs the contributions of frequency bands containing useful signal energy. Therefore, the system reintroduces relative amplitude information to the distance calculation by weighting each component by the standard deviations computed from the reference pattern as shown in equation (2) below. This must be normalized by the total magnitude of the signal:

$$D_w=[((\mathrm{std}_1)^*(1-cv_1))^2+((\mathrm{std}_2)^*(1-cv_2))^2+((\mathrm{std}_3)^*(1-cv_3))^2]^{1/2}/[(\mathrm{std}_1)^2+(\mathrm{std}_2)^2+(\mathrm{std}_3)^2]^{1/2} \quad (2)$$

The sequence of operations can be rearranged to combine some steps and eliminate others. The resulting weighted Euclidean distance automatically adapts to the relative amplitudes of the frequency bands and will tend to reduce the effects of broadband noise that is present at the portable unit and not at the source.

A variation of the weighted Euclidean distance involves integrating or averaging successive distances calculated from a sequence of feature packets received from a portable unit as shown in FIG. 11. In this procedure, the weighted distance is computed as above for the first packet. A second packet is then obtained and precisely aligned with feature blocks from the same source in the central computer. Again, the weighted Euclidean distance is calculated. If the two packets are from the same source, the minimum distance will occur at the same relative time delay in the distance calculation. For each of the 64 time delays in the distance array for a particular source the system computes a recursive update of the distance where the averaged distance is decayed slightly by multiplying it by a coefficient k that is less than one. The newly calculated distance is then scaled by multiplying it by (1−k) and adding it to the average distance. For a particular time delay value within the distance array the update procedure can be expressed as shown in equation (3) below:

$$\mathbf{D}_w(n)=k^*\mathbf{D}_w(n-1)+(1-k)^*D_w(n) \quad (3)$$

Note that the bold notation $\mathbf{D}_w$ indicates the averaged value of the distance calculation, (n) refers to the current update cycle, and ($n$−1) refers to the previous update cycle. This process is repeated on subsequent blocks, recursively integrating more signal energy. The result of this is an improved signal-to-noise ratio in the distance calculation that reduces the probability of false detection.

The decision rule for this process is the same as for the un-averaged case. The minimum averaged distance from all sources is first found. This is compared with a distance threshold. If the minimum distance is less than the threshold, a detection has occurred and the source identification is recorded. Otherwise the system reports that the source is unknown.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for correlating a first packet of feature waveforms from an unknown source with a second packet of feature waveforms from a known broadcast audio source in order to associate a known broadcast audio source with the first packet of feature waveforms, comprising the steps of:

(A) receiving free field audio signals using a microphone that is included in a portable data collection unit, wherein the free field audio signals are audible to a user proximate the portable data collection unit, and generating the first packet of feature waveforms in accordance with said free field audio signals received by the microphone; and determining, with at least one processor, at least first, second and third correlation values ($cv_1$, $cv_2$, $cv_3$) by correlating features from the first and second packets, wherein the first correlation value ($cv_1$) is determined by correlating features associated with a first frequency band from the first and second packets, the second correlation value ($cv_2$) is determined by correlating features associated with a second frequency band from the first and second packets, and the third correlation value ($cv_3$) is determined by correlating features associated with a third frequency band from the first and second packets;

(B) computing, with said at least one processor, a first weighting value in accordance with the features from the second packet associated with the first frequency band, a second weighting value in accordance with the features from the second packet associated with the second frequency band, and a third weighting value in accordance with the features from second packet associated with the third frequency band;

(C) computing, with said at least one processor, a weighted Euclidean distance value ($D_w$) representative of differences between the first and second packets from the first, second and third correlation values and the first, second and third weighting values;

wherein the first weighting value corresponds to a standard deviation ($\mathrm{std}_1$) of the features from the second packet associated with the first frequency band, the second weighting value corresponds to a standard deviation ($\mathrm{std}_2$) of the features from the second packet associated with the second frequency band, and the third weighting value corresponds to a standard deviation ($\mathrm{std}_3$) of the features from the second packet associated with the third frequency band;

wherein the weighted Euclidean distance value ($D_w$) is determined in accordance with the following equation:

$$D_w=[((\mathrm{std}_1)^*(1-cv_1))^2+((\mathrm{std}_2)^*(1-cv_2))^2+((\mathrm{std}_3)^*(1-cv_3))^2]^{1/2}/[(\mathrm{std}_1)^2+\mathrm{std}_2)^2+(\mathrm{std}_3)^2]^{1/2};$$

and (D) determining, with said at least one processor and in accordance with the weighted Euclidean distance value ($D_w$), whether the first packet derived from the free field audio signals received by the microphone in the portable data collection unit is associated with the known broadcast audio source.

2. A method for correlating a packet of feature waveforms from an unknown source with a packet of feature waveforms from a known broadcast audio source in order to associate a known broadcast audio source with the packet of feature waveforms from the unknown source, comprising, the steps of:

(A) receiving free field audio signals using a microphone that is included in a portable data collection unit, wherein the free field audio signals are audible to a user proximate the portable data collection unit, and generating a first packet of feature waveforms in accordance with said free field audio signals received by the microphone; and determining, with at least one processor, at least first, second and third correlation values by correlating features from the first packet and a second packet associated with the known broadcast audio source, wherein the first correlation value is determined by correlating features associated with a first frequency band from the first and second packets, the second correlation value is determined by correlating features associated with a second frequency band from the first and second packets, and the third correlation value is determined by correlating features associated with a third frequency band from the first and second packets;

(B) computing, with said at least one processor, a Euclidean distance value (D(n−1)) representative of differences between the first and second packets from the first, second and third correlation values;

(C) receiving free field audio signals using the microphone that is included in the portable data collection unit in order to generate a third packet of feature waveforms in accordance with said free field audio signals received by the microphone; and determining, with said at least one processor, at least fourth, fifth and sixth correlation values by correlating features from the third packet and a fourth packet associated with the known broadcast audio source, wherein the fourth correlation value is determined by correlating features associated with the first frequency band from the third and fourth packets, the fifth correlation value is determined by correlating features associated with the second frequency band from the third and fourth packets, and the sixth correlation value is determined by correlating features associated with the third frequency band from the third and fourth packets;

(D) computing, with said at least one processor, a Euclidean distance value (D(n)) representative of differences between the third and fourth packets from the fourth, fifth and sixth correlation values;

(E) updating, with said at least one processor, the Euclidean distance value (D(n)) using the Euclidean distance value (D(n−1)); and (F) determining with said at least one processor and in accordance with the updated Euclidean distance value (D(n)), whether the third packet derived from the free field audio signals received by the microphone in the portable data collection unit is associated with the known broadcast audio source.

3. The method of claim 2, wherein the second and fourth packets are known a priori to represent signals broadcast from the known source.

4. The method of claim 3, wherein the third packet is positioned immediately after the first packet in a sequence of packets of feature waveforms.

5. The method of claim 4, wherein the fourth packet is positioned immediately after the second packet in a sequence of packets of feature waveforms.

6. The method of claim 5, wherein the updated the Euclidean distance value (D(n)) is determined in step (E) in accordance with the following equation:

$$D(n)-k*D(n-1)+(1-k)*D(n)$$

where k is a coefficient that is less than 1.

7. The method of claim 2, wherein step (F) comprises:

(F) associating the third frequency packet with the known source if the updated Euclidean distance value (D(n)) is less than a threshold.

* * * * *